(12) United States Patent
Thorn

(10) Patent No.: US 8,144,939 B2
(45) Date of Patent: Mar. 27, 2012

(54) AUTOMATIC IDENTIFYING

(75) Inventor: Ola Karl Thorn, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1170 days.

(21) Appl. No.: 11/936,991

(22) Filed: Nov. 8, 2007

(65) Prior Publication Data

US 2009/0122198 A1    May 14, 2009

(51) Int. Cl.
    *G06K 9/00*    (2006.01)
(52) U.S. Cl. .................................. 382/115; 709/206
(58) Field of Classification Search ................ 382/115
    See application file for complete search history.

(56) References Cited

U.S. PATENT DOCUMENTS

| | | | |
|---|---|---|---|
| 6,608,563 B2 * | 8/2003 | Weston et al. | 340/573.1 |
| 6,728,679 B1 * | 4/2004 | Strubbe et al. | 704/270.1 |
| 6,731,307 B1 * | 5/2004 | Strubbe et al. | 715/727 |
| 2004/0066953 A1 | 4/2004 | Bock | |
| 2006/0013446 A1 | 1/2006 | Stephens | |
| 2007/0239457 A1 | 10/2007 | Sorvari et al. | |
| 2009/0122198 A1 * | 5/2009 | Thorn | 348/715 |
| 2009/0322873 A1 * | 12/2009 | Reilly et al. | 348/143 |

FOREIGN PATENT DOCUMENTS

| | | |
|---|---|---|
| EP | 0 944 019 A2 | 9/1999 |
| EP | 1 432 226 A1 | 6/2004 |
| WO | WO 02/061666 A1 | 8/2002 |
| WO | WO 02/086801 A1 | 10/2003 |

OTHER PUBLICATIONS

International Search Report and Written Opinion mailed Oct. 9, 2008, issued in corresponding international application No. PCT/IB2008/051792, 14 pages.
Nguyen, P. et al.: Speech Technology for Multimedia Content Management; Consumer Communications and Networking Conference, 2004. Jan. 2004, pp. 376-381.
Patrick Reignier, "Finding a Face by Blink Detection", ECVNet, http://www-prima.imag.fr/ECVNet/IRS95/node13.html, Jul. 21, 1995, 2 pages.
"Speaker Recognition", Wikipedia, http://en.wikipedia.org/wiki/Speaker_identification, Print Date: Oct. 23, 2007, 3 pages.

* cited by examiner

*Primary Examiner* — Gregory M Desire
(74) *Attorney, Agent, or Firm* — Snyder, Clark, Lesch & Chung, LLP

(57) ABSTRACT

A method includes storing a picture or video that includes a first person. The method also includes automatically identifying the first person using speaker recognition or image recognition and tagging the picture or video with information indicating that the first person is in the picture or video.

20 Claims, 8 Drawing Sheets

110

440

| | NAME 510 | VOICE INFORMATION 520 | IMAGE INFORMATION 530 | OTHER INFORMATION 540 |
|---|---|---|---|---|
| 550 | JANE | | | |
| 552 | BILL | | | |
| 554 | ANNA | | | |
| 556 | | | | |
| 558 | | | | |
| | ⋮ | | | |

FIG. 5

| ALICE | BETTY | CHRIS | DAVID | EMILY | FRED | GEORGE | HELEN | JANE | ... |
|-------|-------|-------|-------|-------|------|--------|-------|------|-----|
| ANNA  | BILL  |       | DAWN  |       |      |        |       | JIM  |     |
| ANTON |       |       |       |       |      |        |       |      |     |
| ⋮     |       |       |       |       |      |        |       |      |     |

AUTOMATIC IDENTIFYING

TECHNICAL FIELD OF THE INVENTION

The invention relates generally to processing information and, more particularly, to automatically identifying or tagging information of interest.

DESCRIPTION OF RELATED ART

Communication devices, such as mobile terminals, may be used by individuals for communicating with users of other communication devices. For example, a communication device may be used to place and receive calls and to send and receive text messages. Communication devices now often include additional features, such as cameras, that allow the user to take pictures and/or videos.

SUMMARY

According to a first aspect, a method in a device comprises storing a picture or video, the picture or video including at least a first person and automatically identifying the first person using at least one of speaker recognition or image recognition. The method also includes tagging the picture or video with information indicating that the first person is in the picture or video.

Additionally, the method may include storing the picture or video with a group of pictures or videos associated with the first person.

Additionally, the method may include providing an interface associated with retrieving pictures stored in the device, receiving a selection via the interface, the selection identifying a second person, retrieving a plurality of pictures associated with the second person based on the selection, and displaying the plurality of pictures.

Additionally, the method may include storing voice related information associated with the first person, and the identifying the first person may include identifying the first person by comparing received voice input from the first person to the stored voice related information associated with the first person.

Additionally, the method may include storing image information associated with a plurality of people, and the identifying the first person may include comparing the picture or video to the stored image information associated with the plurality of people, and identifying the first person based on the comparing.

Additionally, the method may include identifying an electronic mail address associated with the first person, and automatically sending the picture or video to the electronic mail address associated with the first person.

Additionally, the method may include storing unique words voiced by the first person, and the identifying the first person may include identifying the first person based on receipt of one of the unique words.

Additionally, the method may further include storing voice information associated with a plurality of people, storing image information associated with at least some of the plurality of people, storing a plurality of pictures, identifying people in at least some of the plurality of pictures using the stored image information, identifying people present when at least some of the plurality of pictures were taken using the stored voice information, and tagging the at least some of the plurality of pictures with identification information corresponding to the identified people.

According to another aspect, a computer-readable medium having stored sequences of instructions may be provided. The instructions, when executed by at least one processor, cause the at least one processor to access a picture including at least a first person, identify the first person using image recognition and display the picture with information identifying the first person.

Additionally, the computer-readable medium may include instructions for causing the at least one processor to tag the picture with information indicating that the first person is in the picture.

Additionally, the computer-readable medium may include instructions for causing the at least one processor to sort the picture based on the tag.

Additionally, the computer-readable medium may include instructions for causing the at least one processor to display the information identifying the first person for a period of time and remove the information in the picture identifying the first person after the period of time.

Additionally, the computer-readable medium may include instructions for causing the at least one processor to provide an interface for accessing stored pictures, the interface including a plurality of names. The instructions may also cause the at least one processor to retrieve, in response to selection of a first one of the plurality names, pictures associated with the first name.

Additionally, the computer-readable medium may include instructions for causing the at least one processor to automatically signal a messaging program to transmit the picture to an electronic mail address associated with the first person.

Additionally, the computer-readable medium may include instructions for causing the at least one processor to identify a plurality of people present when the picture was taken, and signal a messaging program to transmit the picture to electronic mail addresses associated with the plurality of people.

Additionally, computer-readable medium may include instructions for causing the at least one processor to identify at least one other person in the picture using voice recognition.

According to a further aspect, a device including a memory, a camera and processing logic is provided. The camera is configured to take a picture including at least a first person, and store the picture in the memory. The processing logic is configured to identify the first person using at least one of speaker recognition or image recognition.

Additionally, the processing logic may be further configured to store a tag with the picture or a link to the tag in the memory, the tag identifying the first person.

Additionally, the device may include a display. The processing logic may be further configured to receive a selection identifying the first person, and display the picture via the display, the display including information identifying the first person.

Additionally, the processing logic may be configured to provide an input interface to a user of the device, the input interface being configured to allow a user to select a name or label associated with the first person, and retrieve, in response to selection of the name or label, a plurality of pictures associated with the first person.

Additionally, the processing logic may include speaker recognition logic configured to receive voice input from the first person, and identify the first person using speaker recognition.

Additionally, the processing logic may include person identifier logic configured to store image related information associated with a plurality of people in a database, and identify the first person based on the stored image related information.

Additionally, the processing logic may be further configured to identify parties in pictures using information stored in the database.

BRIEF DESCRIPTION OF THE DRAWINGS

Reference is made to the attached drawings, wherein elements having the same reference number designation may represent like elements throughout.

FIG. 5 is an exemplary database implemented in one of the components illustrated in FIG. 4;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Exemplary System

Figure 1:
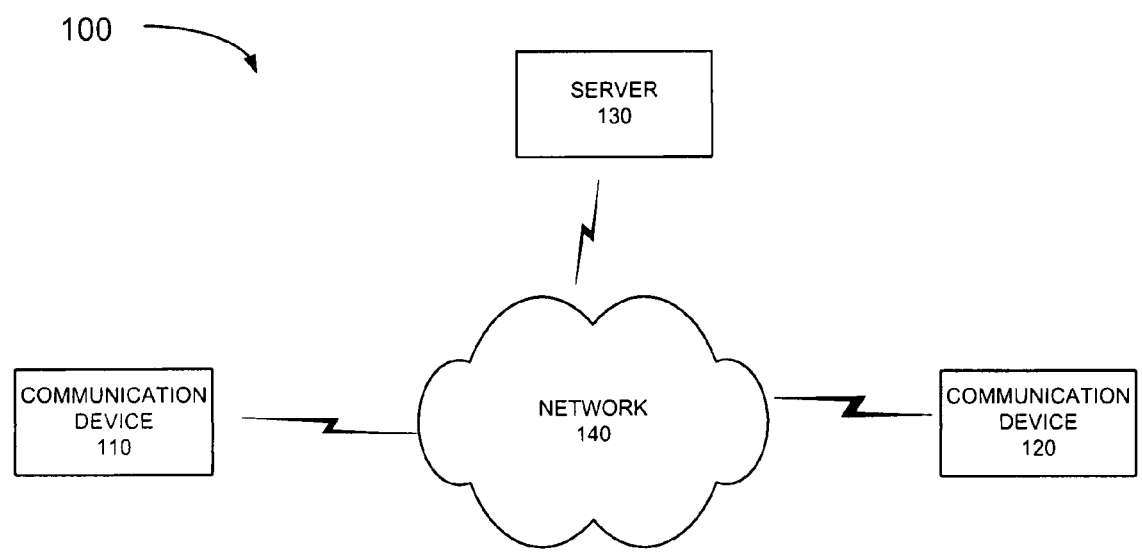
FIG. 1 is a diagram of an exemplary system in which methods and systems described herein may be implemented.

FIG. 1 is a diagram of an exemplary system 100 in which methods and systems described herein may be implemented. System 100 may include communication devices 110 and 120 and server 130 connected via network 140. The exemplary configuration illustrated in FIG. 1 is provided for simplicity. It should be understood that a typical system may include more or fewer devices than illustrated in FIG. 1. In addition, other devices that facilitate communications between the various entities illustrated in FIG. 1 may also be included in system 100.

Communication devices 110 and 120 may each include any type of conventional device that is able to communicate via a network. For example, communication devices 110 and 120 may include any type of device that is capable of transmitting and receiving data (e.g., voice, text, images, multi-media data) to/from network 140. In an exemplary implementation, one or both of communication devices 110 and 120 may be a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; a portable game and/or music playing device; and/or a conventional laptop and/or palmtop receiver or other appliance that includes a radiotelephone transceiver. Mobile terminals may also be referred to as "pervasive computing" devices.

In an alternative implementation, one or both of communication devices 110 and 120 may include any client device, such as a personal computer (PC), a laptop computer, a PDA, a web-based appliance, etc., that is able to transmit and receive data via network 140.

Server 130 may include any server/computing device that is able to connect to network 140 and transmit and receive data via network 140. Server 130 may be associated with a service provider that provides communication-related services for communication devices 110 and/or 120.

Communication devices 110 and 120 may communicate with each other over network 140 via wired, wireless or optical connections. Communication devices 110 and 120 may also communicate with server 130 over network 140 via wired, wireless or optical connections.

Network 140 may include one or more networks including a cellular network, a satellite network, the Internet, a telephone network, such as the Public Switched Telephone Network (PSTN), a metropolitan area network (MAN), a wide area network (WAN), a local area network (LAN), a mesh network, or another type of network. In an exemplary implementation, network 140 may include a cellular network that uses components for transmitting data to and from communication devices 110 and 120 and server 130. Such components may include base station antennas (not shown) that transmit and receive data from communication devices within their vicinity. Such components may also include base stations (not shown) that connect to the base station antennas and communicate with other devices, such as switches and routers (not shown) in accordance with known techniques.

Figure 2:
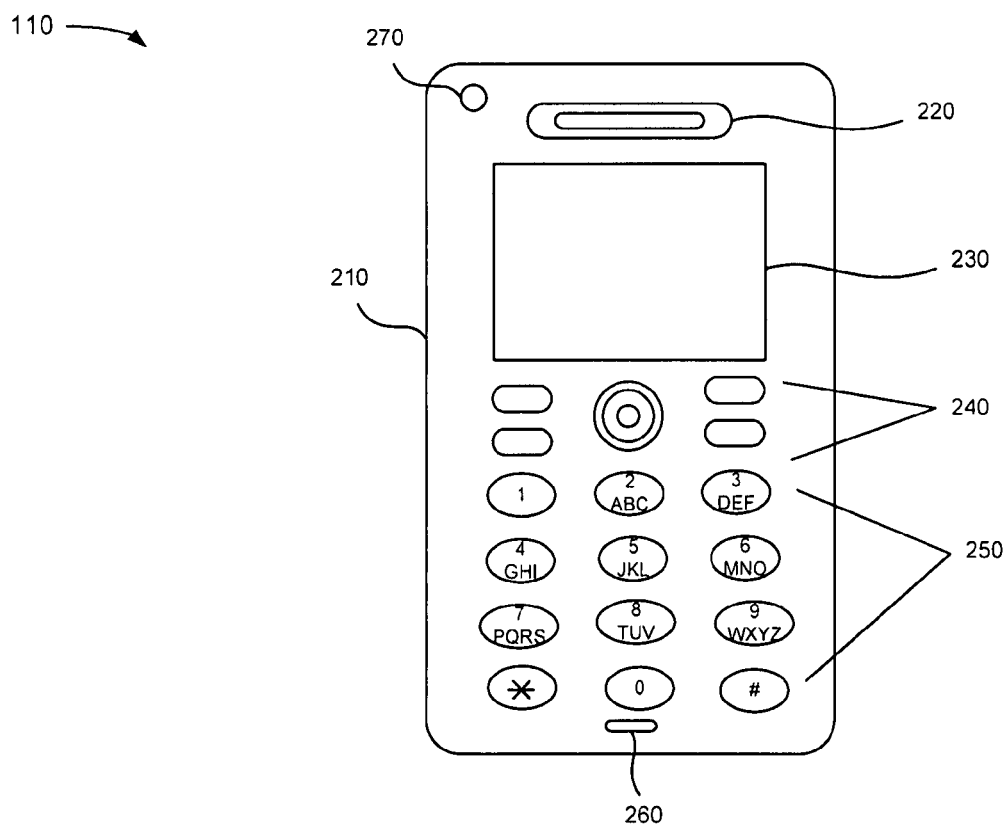
FIG. 2 is a diagram of a communication device of FIG. 1 according to an exemplary implementation.

FIG. 2 is a diagram of an exemplary communication device 110 in which methods and systems described herein may be implemented. Aspects of the invention are described herein in the context of a communication device. It should also be understood that systems and methods described herein may also be implemented in other devices that allow users to store information, such as pictures or videos, with or without including various other communication functionality. For example, communication device 110 may include a video or still image camera, a personal computer (PC), a laptop computer, a PDA, a media playing device (e.g., an MPEG audio layer 3 (MP3) player, a video game playing device), etc., that may not include various communication functionality for communicating with other devices.

Referring to FIG. 2, communication device 110 may include housing 210, speaker 220, display 230, control buttons 240, keypad 250, microphone 260 and camera 270. Housing 210 may protect the components of communication device 110 from outside elements. Speaker 220 may provide audible information to a user of communication device 110.

Display 230 may provide visual information to the user. For example, display 230 may provide information regarding incoming or outgoing telephone calls and/or incoming or outgoing electronic mail (e-mail), instant messages, short message service (SMS) messages, etc. Display 230 may also display images associated with camera 270. For example, display 230 may display images currently focused on by a lens or view finder of camera 270. Display 230 may also be used to display pictures or videos taken by camera 270 and/or received by communication device 110. Display 230 may further display information regarding various applications executed by communication device 110, such as a phone book/contact list program, a calendar, an organizer application used to organize, for example, pictures/videos as described in detail below, as well as other applications. Display 230 may also display the current time, video games being played by a user, downloaded content (e.g., news or other information), etc.

Control buttons 240 may permit the user to interact with communication device 110 to cause communication device 110 to perform one or more operations, such as place a telephone call, play various media, etc. For example, control buttons 240 may include a dial button, hang up button, play button, etc. Control buttons 240 may also include one or more control buttons for activating and/or controlling camera 270 and/or controlling an accessory associated with camera 270, such as a lens cover, shutter button, etc. In an exemplary implementation, control buttons 240 may also include one or more buttons that controls various settings associated with display 230. For example, one of control buttons 240 may be used to launch an organizer application program that may be used to organize pictures/videos. Further, one of control buttons 240 may be a menu button that permits the user to view options associated with executing various application programs stored in communication device 110.

Keypad 250 may include a standard telephone keypad used to enter numbers and/or text. Other types of input devices may also be provided. For example, in other implementations, a touch screen may be provided to enter information. In still other implementations, a speech-to-text engine or other devices may be used to input information to communication device 110.

Microphone 260 may receive audible information from the user and from other parties in the vicinity of communication device 110. Audible information received via microphone 260 may be used to identify particular parties, as described in detail below.

Camera 270 may include conventional camera elements that enable communication device 110 to take pictures and/or videos. Camera 270 may store the pictures/videos in communication device 110 and/or other possibly remote locations. Camera 270 may also communicate with processing logic within communication device 110 to control various aspects with respect to taking pictures and storing pictures, as described in detail below.

Figure 3:
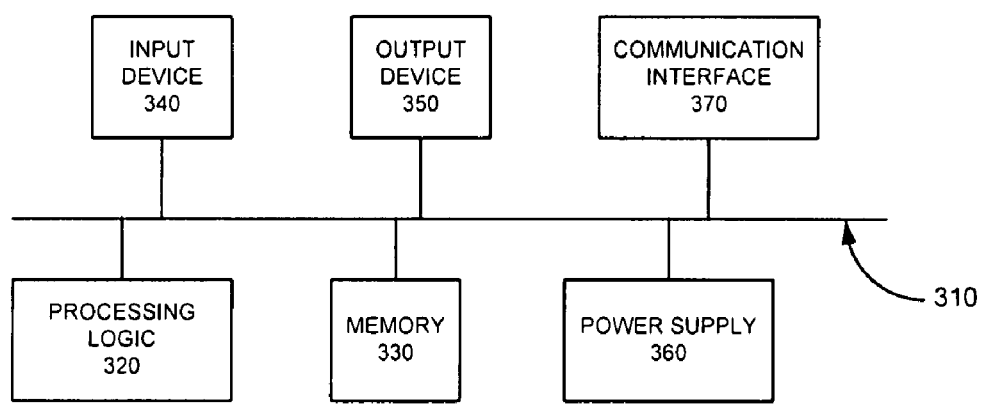
FIG. 3 is a functional block diagram of components implemented in the communication device of FIG. 2 according to an exemplary implementation.

FIG. 3 is a diagram illustrating components of communication device 110 according to an exemplary implementation. Communication device 110 may include bus 310, processing logic 320, memory 330, input device 340, output device 350, power supply 360 and communication interface 370. Bus 310 permits communication among the components of communication device 110. One skilled in the art would recognize that communication device 110 may be configured in a number of other ways and may include other or different elements. For example, communication device 110 may include one or more modulators, demodulators, encoders, decoders, etc., for processing data.

Processing logic 320 may include a processor, microprocessor, an application specific integrated circuit (ASIC), field programmable gate array (FPGA) or the like. Processing logic 320 may execute software instructions/programs or data structures to control operation of communication device 110.

Memory 330 may include a random access memory (RAM) or another type of dynamic storage device that stores information and instructions for execution by processing logic 320; a read only memory (ROM) or another type of static storage device that stores static information and instructions for use by processing logic 320; a flash memory (e.g., an electrically erasable programmable read only memory (EEPROM)) device for storing information and instructions; and/or some other type of magnetic or optical recording medium and its corresponding drive. Memory 330 may also be used to store temporary variables or other intermediate information during execution of instructions by processing logic 320. Instructions used by processing logic 320 may also, or alternatively, be stored in another type of computer-readable medium accessible by processing logic 320.

Input device 340 may include mechanisms that permit an operator to input information to communication device 110, such as microphone 260, keypad 250, control buttons 240, a keyboard, a gesture-based device, an optical character recognition (OCR) based device, a joystick, a virtual keyboard, a speech-to-text engine, a mouse, a pen, voice recognition and/or biometric mechanisms, etc.

Output device 350 may include one or more mechanisms that output information to the user, including a display, such as display 230, a printer, one or more speakers, such as speaker 220, etc. Power supply 360 may include one or more batteries or other power source components used to supply power to components of communication device 110.

Communication interface 370 may include any transceiver-like mechanism that enables communication device 110 to communicate with other devices and/or systems. For example, communication interface 370 may include a modem or an Ethernet interface to a LAN. Communication interface 370 may also include mechanisms for communicating via a network, such as a wireless network (e.g., network 140). For example, communication interface 370 may include one or more radio frequency (RF) transmitters, receivers and/or transceivers and one or more antennas for transmitting and receiving RF data via network 140.

Communication device 110 may provide a platform for a user to place and receive telephone calls, send and receive electronic mail, text messages, multi-media messages, short message service (SMS) messages, take and receive pictures/videos, and execute various other applications. Communication device 110, as described in detail below, may also perform processing associated with automatically tagging and/or organizing information, such as pictures and videos. Communication device 110 may perform these operations in response to processing logic 320 executing sequences of instructions contained in a computer-readable medium, such as memory 330. Such instructions may be read into memory 330 from another computer-readable medium via, for example, communication interface 370. A computer-readable medium may include one or more memory devices. In alternative embodiments, hard-wired circuitry may be used in place of or in combination with software instructions to implement processes consistent with the invention. Thus, implementations described herein are not limited to any specific combination of hardware circuitry and software.

Figure 4:
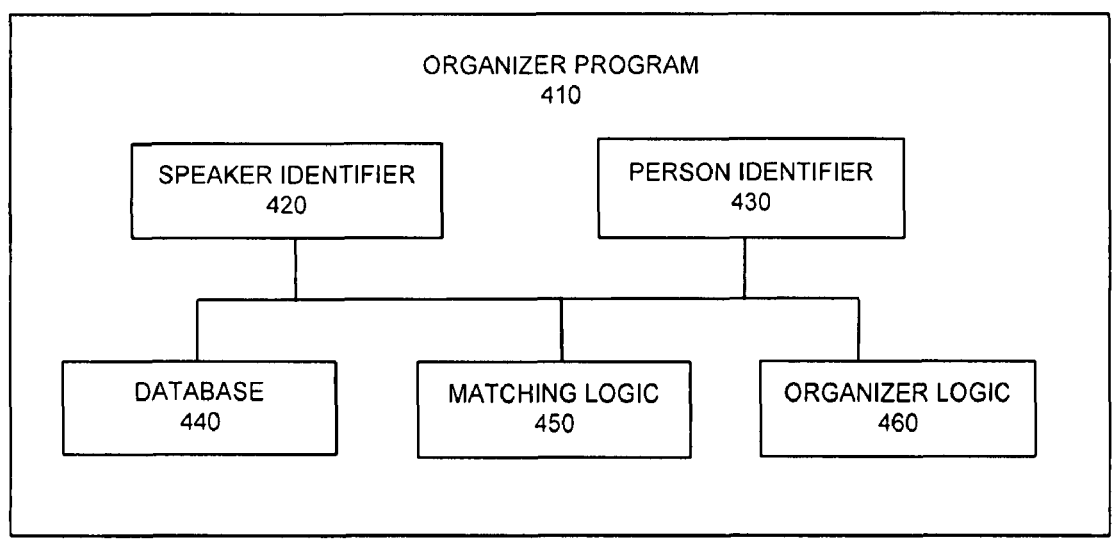
FIG. 4 is a functional block diagram of components implemented in the communication device of FIG. 3 according to an exemplary implementation.

FIG. 4 is an exemplary functional block diagram of components implemented in communication device 110 of FIG. 3, such as in memory 330. Referring to FIG. 4, memory 330 may include an organizer program 410 that includes speaker identifier 420, person identifier 430, database 440, matching logic 450 and organizer logic 460. Speaker identifier 420, person identifier 430, database 440, matching logic 450 and organizer logic 460 are shown in FIG. 4 as being included in organizer program 410. In alternative implementations, these components or a portion of these components may be located externally with respect to organizer program 410. For example, in some implementations, one or more of these components may be executed by other application programs stored in communication device 110, such as in a messaging program. In still other implementations, one or more of these components may be located externally with respect to communication device 110. For example, one or more of these components could be executed by server 130 (FIG. 1). In addition, the components in FIG. 4 are illustrated as discrete components. In other implementations, the functions described below as being performed by one or more of these components may be performed by a single component and/or the functions described as being formed by one of these components may be performed by another component.

Speaker identifier 420 may include logic used to extract various voice-related information and speech patterns associated with a number of different people. For example, speaker identifier 420 may extract acoustic patterns, frequency information, and other information associated with a person's speech. Speaker identifier 420 may also extract learned behavioral patterns associated with a person's speech, such as speaking style (e.g., grammar, dialect, accent, etc), speech patterns, pitch, etc. Speaker identifier 420 may use this information to create a voiceprint or model that may be stored in database 440. The term "voiceprint" as used herein should be construed to include any characteristic or set of characteristics associated with a human voice that may be used to identify an individual. In this case, the voiceprints stored in database 440 may be used to identify various parties when they speak and to tag pictures/videos with labels, as described in detail below.

Person identifier 430 may include logic to extract an image of a person's face and/or head and store the image or image-related information in database 440. Person identifier 430 may operate when camera 270 is activated. For example person identifier 430 may attempt to match images focused on by camera 270 with image information stored in database 440. Person identifier 430 may also operate to match images in stored pictures with image information stored in database 440. Person identifier 430 may further operate during a video call from communication device 110 to a party at another communication device (e.g., communication device 120). For example, person identifier 430 may extract an image of the called party's face displayed on the display screen of communication device 110 during the video call and store this image or image-related information associated with the called party's face in an entry in database 440 associated with the particular person. For example, person identifier 430 may identify the called party based on contact information for the called party stored in a messaging program executed by communication device 110, as described in more detail below. Person identifier 430 may then store the image information in an entry corresponding to the called party in database 440. This image information may then be used to identify the person at a later time.

In some implementations, person identifier 430 may detect a face by using blink detection. For example, if the called party is in a room with a lot of objects, a face may be detecting by detecting a blinking pattern associated with the person's eyes, as opposed to static pattern associated with inanimate objects in the room. Person identifier 430 may then be able to extract the desired image information once a face has been detected. Still further, in other implementations, person identifier 430 may identify a face by detecting opening/closing of a person's mouth. Detecting this change in images may aid person identifier 430 in being able to detect one or more faces in a scene with a large number of objects. Person identifier 430 may detect a face/person using any other conventional mechanism (e.g., movement associated with the person) and capture image related information associated with the face.

Database 440 may include a database that includes names and other information associated with various parties. For example, FIG. 5 illustrates an exemplary database 440 consistent with aspects described herein. Referring to FIG. 5, database 440 may include a name field 510, voice information field 520, image information field 530 and other information field 540. Database 440 may be dynamically populated as the user of communication device 110 communicates with other parties, such as during a telephone call (e.g., a regular telephone call, a video call, etc.), while taking pictures or videos via camera 270, while talking to friends, etc., as described in detail below.

Name field 510 may store names of various parties. These names may include the names of people with whom the user of communication device 110 communicates. For example, these names may correspond to names stored in a contacts list program stored in communication device 110.

Voice information field 520 may store information extracted and/or generated by speaker identifier 420. This information may include, for example, voice templates and/or models that are used to identify various parties when they speak based on their particular voice characteristics.

Image information field 530 may store image (e.g., face and/or head related images) and image related information generated and/or extracted by person identifier 430. For example, image information field 530 may store faces and/or face related information associated with a number of persons with whom the user of communication device 110 comes into contact and/or communicates.

Other information field 540 may include additional information that may be used to identify a person. For example, other information field 540 may store unique words/phrases that have been used by a particular person. These unique words/phrases may aid in identifying the particular person. The determination of the unique/distinctive character may be made relative to other words/phrases stored in communication device 110. As an example, assume that a person used the term "brontosaurus" during a conversation. A speech-to-text engine included in communication device 110 may identify this word as being an unusual word based on lack of use of this word by other parties. This word may be stored in other information field 540 and may be helpful when identifying a friend of the user of communication device 110 who happens to study dinosaurs.

Matching logic 450 may include hardware and/or software that matches a voice and/or image of a person to information stored in database 440. For example, matching logic 450 may match a voice to information in voice information field 520. Matching logic 450 may also match image information to information stored in image information field 530. Matching logic 450 may then, for example, automatically tag a picture with a particular person's name, organize pictures associated with various people, automatically send a picture to various people, etc., as described in detail below.

Organizer logic 460 may include logic that organizes pictures and/or videos based on tag information stored with the pictures/images, as described in detail below. Organizer logic 460 may also automatically signal communication device 110 to send pictures and/or videos to various contacts listed in a contacts list, as described in detail below.

Exemplary Processing

Figure 6:
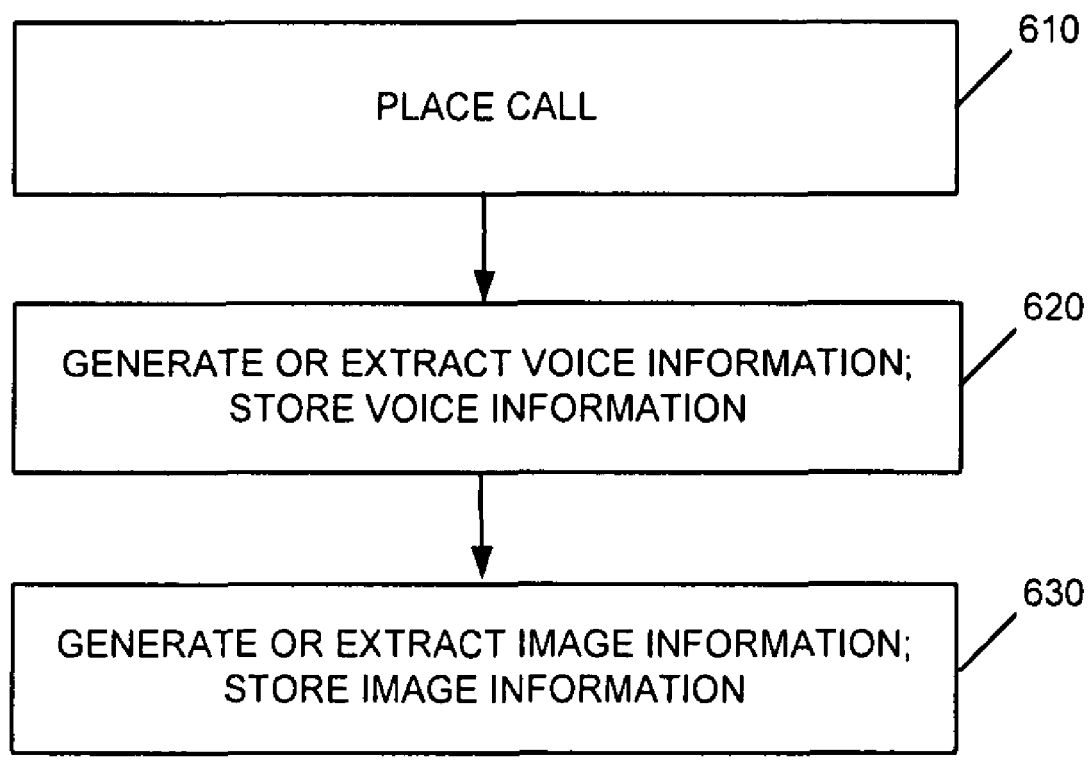
FIGS. 6 and 7 are flow diagrams illustrating exemplary processing by the communication device of FIG. 1.

FIG. 6 is a flow diagram illustrating exemplary processing by communication device 110 for populating database 440. Processing may begin with a user of communication device 110 (e.g., Mike) placing a telephone call to a party listed in a contacts list of a messaging program stored in communication device 110 (act 610). The contact list may store the names, telephone numbers, email addresses, session initiation protocol (SIP) address etc., of various people with whom the user of communication device 110 communicates.

Assume that the Mike places the telephone call to Jane at communication device 120. Further assume that Jane answers the telephone call and begins to speak to Mike at communication device 110. Speaker identifier 420 at communication device 110 may then extract acoustic patterns, frequency information, speaking style (e.g., grammar, dialect, accent, etc.), speech patterns, pitch, and other information associated with Jane's voice. Speaker identifier 420, as described above, may generate a voiceprint associated with Jane's voice using this information and store this voiceprint in voice information field 520 of entry 550 (act 620). This voiceprint may be used to later identify Jane when Jane is speaking.

In some implementations, speaker identifier 420 may also store portions of the conversation with Jane. For example, speaker identifier 420 may extract common words spoken by Jane during the conversation, such as "Hello," "Bye," etc., and store this information in voice information field 520 of entry 550 (act 620). These commonly used words may also be used to aid in identifying Jane when she is speaking at a later time. Speaker identifier 420 may also identify unusual or unique words spoken by Jane during the conversation and store this information in other information field 540 of entry 550 (act 620). These unique words may further aid in identifying Jane at a later time. For example, assume that the word "velocipede" is spoken by Jane during the conversation with Mike. Speaker identifier 420 may identify this word as unique and may store this word in other information field 540 of entry 550. If a person later speaks this word, there may be a good chance that the person using this unique word is Jane.

It should be understood that by storing characteristic information associated with Jane's voice and/or certain portions of the conversation with Jane, as opposed to saving an entire conversation in database 440, saves considerable space in database 440 and in memory 330 of communication device 110. The characteristic information (e.g., a voiceprint, however, still allows Jane's voice to be recognized at a later time.

In some implementations, person identifier 430 may attempt to store image information associated with Jane in image information field 530 of entry 550. For example, a contacts list program stored in communication device 110 may have stored images associated with various contacts. In this case, person identifier 430 may access the contacts list and retrieve an image for a particular party in database 440. For example, person identifier 430 may access a contacts program, determine that the call was place to Jane (based on the telephone number called), identify an image for Jane and retrieve the image information for Jane. Person identifier 430 may then store the image of Jane in image information field 530 for entry 550 (act 630). Alternatively, person identifier 430 may generate and store image related information for Jane in image information field 530 of entry 550 at a later time.

Organizer program 410 may continue to operate in this manner as the user of communication device (i.e., Mike in this example) continues to make and receive telephone calls. In addition, organizer program 410 may also populate database 440 with information receive during other types of calls, such as video calls that include a video portion.

For example, assume that Mike accesses a contacts list stored in communication device 110 and places a video call to Bill. Speaker identifier 420 may store characteristic information associated with Bill's voice during the call in a similar manner as that described above. Speaker identifier 420 may store this information in voice information field 520 of entry 552. Speaker identifier 420 may also store other voice and/or speech information in other information field 540 of entry 552.

Person identifier 430 may also store image information associated with Bill in database 440 (act 630). For example, person identifier 430 may store an image of Bill's face that is displayed on, for example, display 230 of communication device 110 during the video call with Bill. Alternatively, person identifier 430 may generate image related information associated with Bill's face that may be used to later identify Bill. This image related information may be characteristic information associated with Bill's face, such as distances between various facial features (e.g., eyes, nose, mouth, etc.), the size of various facial features (e.g., eyes, nose, mouth, face), eye color, skin color, etc.

In some implementations, speaker identifier 420 may store voice information for various parties as the user of communication device 110 talks to people during the course of the day. For example, once communication device 110 is powered on, speaker identifier 420 may store voice information for various parties in database 440. That is, speaker identifier 420 may act as a background process that generates or extracts characteristic voice information for various parties, as discussed above, and stores a voiceprint or voice model in voice information field 520.

For example, suppose that Mike meets Anna for lunch and that communication device 110 is powered on. Speaker identifier 420 may extract voice information during the conversation with Anna and generate a voiceprint and/or other voice related information, as described above. Speaker identifier 420 may cache this information. Speaker identifier 420 may later prompt the user of communication device 110 to enter a person's name associated with the voice information. For example, speaker identifier 420 may display a message on display 230, such as "Please enter the name of the person you spoke with at 12:00 PM." Mike may then enter the name "Anna" via keypad 250. Speaker identifier 420 may then store the previously cached information associated with Anna's voice in voice information field 520 of entry 554 in database 440.

As the user of communication device 110 makes additional calls, speaks with more people, etc., organizer program 410 may populate database 440 with information that may later be used to identify various parties, as described in detail below.

In an exemplary implementation, database 440 may have a predetermined size and may be continuously updated in a manner in which unused information is deleted. For example, if an entry for a particular party in database 440 is never indicated as being present in a picture (as described below), that entry may be deleted when database 440 is full or nearly full. In other instances, the voice templates and/or images in database 440 may be stored for a predetermined period of time and automatically deleted upon expiration of the predetermined period.

In each case, organizer program 410 uses information stored in database 440 to automatically tag pictures and/or videos with information identifying parties in the picture, send pictures/videos to various parties in the picture/video and organize pictures/videos based on the tagging, as well as perform other functions, as described in detail below.

Figure 7:
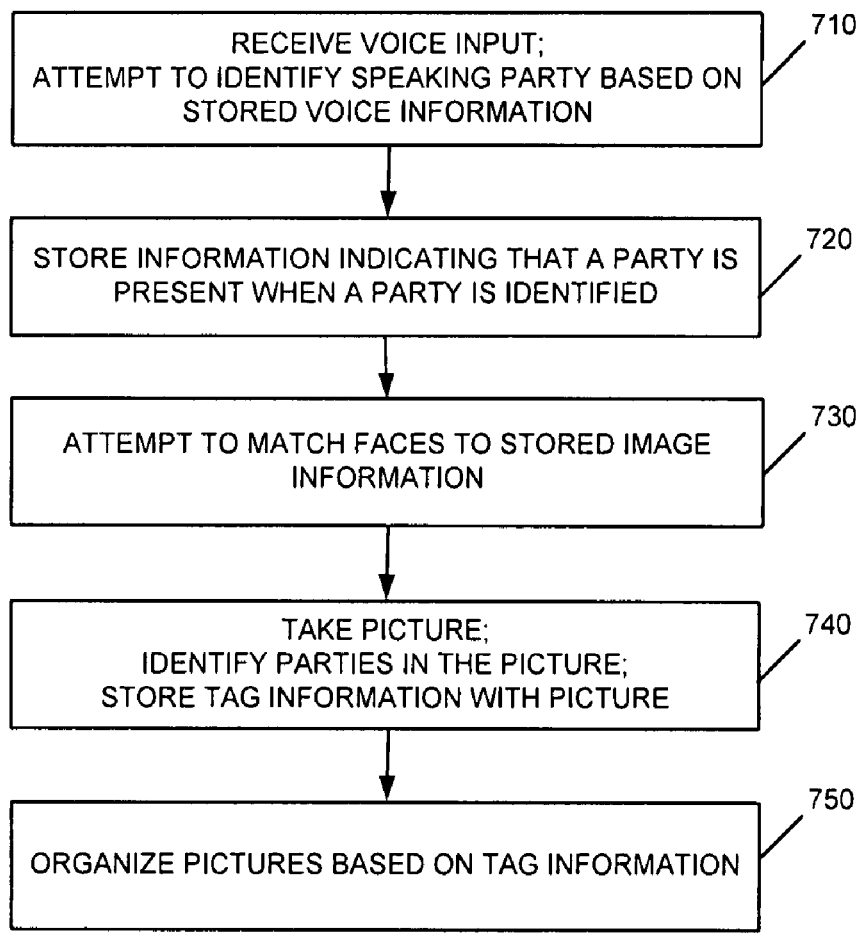

FIG. 7 illustrates exemplary processing performed by organizer program 410. Processing may begin when communication device 110 is turned on. For example, organizer program 410 may automatically execute as a background process once communication device 110 is powered up. Alternatively, organizer program 410 may begin executing when a camera mode associated with communication device 110 is activated. In still other alternatives, organizer program 410 may be activated based on a user launching organizer program 410 via a menu displayed on display 230, via input using control buttons 240 or keypad 250, etc.

In each case, assume that organizer program 410 is activated and that the user of communication device 110 (e.g., Mike in this example) is talking with a group of friends in a room. Matching logic 450 may receive voice information via microphone 260 and attempt to identify the voice of each person talking based on information stored in database 440 (act 710).

For example, suppose that Jane begins to speak. Matching logic 450 may compare characteristic information associated with Jane's voice (e.g., acoustic patterns, frequency, tone, pitch, speech patterns, speaking style, such as grammar, dialect, accent, etc.) to information stored in voice information field 520 to attempt to identify the speaker. Matching logic 450 may compare the received voice input associated with Jane to information stored in voice information field 520 for each entry in database 440 until a match is detected or until each entry has been processed. In this example, assume that matching logic 450 matches Jane's voice to voiceprint information stored in voice information field 520 of entry 550. In this case, matching logic 450 may store information indicating that Jane is currently present (act 720). This presence indication may be stored using a flag, presence indication bit, meta data, or some other indication in name field 510 (or another field) of entry 550.

As discussed previously, in some implementations, matching logic 450 may also identify any unique words spoken by Jane using a speech-to-text engine and compare this information to information stored in other information field 540 to attempt to identify Jane.

Further suppose that Bill begins speaking. Matching logic 450 may determine that a new person is speaking (based on frequency, tone, pitch, speaking stye/pattern, etc.) and compare characteristic information in Bill's voice to information stored in voice information field 520. In this case, assume that matching logic 450 matches Bill's voice to information stored in voice information field 520 for entry 552. Matching logic 450 may store information (e.g., a flag) in name field 510 of entry 552 indicating that Bill is currently present. Matching logic 450 may continue to attempt to match voices to information stored in voice information field 520 to identify other parties that have spoken. Matching logic 540 may also use information stored in other information field 540 to attempt to identify parties that have spoken.

Matching logic 450 may also attempt to match the faces of parties present in the room to image information stored in image information field 530 of database 440 (act 730). For example, assume that camera 270 is activated and that Mike (i.e., the user of communication device 110) is getting ready to take a picture. During this period, Mike may be panning the room with camera 270 before deciding what picture to take. During this panning, the view finder or lens of camera 270 may focus on the faces of various people in the room. These faces may be displayed via display 230 as Mike is moving communication device 110. Matching logic 450 may capture the images of various faces and perform facial recognition on the faces to generate information that can be used to identify the parties. As discussed previously with respect to person identifier 430, matching logic 450 may detect faces as opposed to inanimate objects by identifying a blinking pattern of the person's eyes, opening/closing of the mouth, movement of the person, or via other mechanisms.

In each case, once a face is detected or captured, matching logic 450 may, for example, compare characteristic information associated with a person's face, such as distances between various facial features (e.g., eyes, nose, mouth, etc.), to information stored in image information field 530. As discussed above, in some implementations, person identifier 430 and/or matching logic 450 may detect a face from a number of objects/things in the room using a blink detector that is able to distinguish a face from other objects, by detecting opening/closing of a person's mouth or by other mechanisms. In each case, matching logic 450 may compare the image information associated with each captured face to the image information stored in image information field 530 of database 440 to attempt to find a match to one of the entries in image information field 530 (act 730).

For example, suppose that Anna is in the room and that her image was captured by the view finder of camera 270. In this case, matching logic 450 may extract information regarding Anna's features (e.g., size of various features, distance between various features, the overall dimensions of Anna's face, etc.). Matching logic 450 may then compare this information to stored information in image information field 530. In this example, assume that matching logic 450 finds a match between Anna's image information and the information stored in image information field 530 of entry 554. Matching logic 450 may then identify Anna as being present via, for example, storing a presence indication in name field 510 of entry 554. Therefore, matching logic 450 identifies Anna as being present, even when Anna has not actually spoken. Matching logic 450 may continue in this manner to attempt to identify faces captured by the view finder/lens of camera 270.

Now assume that the user of communication device 110 is ready to take a picture and takes a picture via camera 270 (act 740). Further assume that Jane and Bill are in the picture. Matching logic 540 may perform facial recognition on the images of Jane and Bill in the picture taken by camera 270 and compare this information to information stored in image information field 530 to identify the particular people in the picture (act 740). In this case, assume that matching logic 450 finds a match with the images in the picture to Jane and Bill's previously stored image information. That is, matching logic 540 matches Jane's face in the picture to information stored in image information field 530 of entry 550 and matches Bill's face in the picture to information stored in image information field 530 of entry 552.

Matching logic 450 may then tag the picture with information identifying that Jane and Bill are in the picture (act 740). This tag information may include the names Jane and Bill and may be stored with the picture. Alternatively, the tag may include a link to the names Jane and Bill along with location information indicating where Jane and Bill are located in the picture. Matching logic 450 may then store the picture in memory 330 with the tag information (act 740). In some instances, when the picture is later retrieved from memory 330, the names Jane and Bill are automatically labeled at some portion of the picture (e.g., bottom, top, etc.). In other instances, when the picture is later retrieved from memory 330, the names Jane and Bill are provided next to Jane and Bill's images, respectively. In this implementation, person identifier 430 may identify, for example, coordinates (e.g., a relative location in the picture with respect to a reference point, such as the bottom left corner of the picture) at which each person is located. Person identifier 430 may then insert the tag (e.g., names of the parties in the picture) in the correct position in the picture, such as above the particular person. In such a case, person identifier 430 may, for example, detect edges or sides of the person's face and determine coordinates in the picture of these edges/sides of the face to ensure that the tag does not obscure the person's face in the picture. In still other instances, the names Jane and Bill may be displayed for a brief period of time (e.g., 2 seconds, 5 seconds, etc.) over Jane and Bill's images and then removed. In each case, the user may be able to view the picture and quickly ascertain who is in the picture.

As the user of communication device 110 (e.g., Mike) continues to take pictures, matching logic 450 may continue to identify parties in the pictures and store tag information indicating who is present in the picture. Matching logic 450 may also indicate who else may have been present when the picture was taken. For example, as discussed above, matching logic 450 may determine who was present when a particular picture was taken even if that person was not in the picture. This presence indicator may be stored in name field 510 and may include time stamp information that may be used to determine that the user was present when a picture was taken. When a picture is later retrieved from memory 330, the presence of various people not in the picture may also be provided to the user of communication device 110 via a label. In some instances, the presence of people not actually in the picture may be provided for a brief period and then removed, by selecting a particular function key on control buttons 240 or keypad 250, using a cursor control (e.g., right clicking a mouse), etc. In this manner, additional information associated with pictures taken by the user of communication device 110 may be available to the user.

In some implementations, once a person has been identified based on his/her voice, no additional image recognition may be necessary. For example, if only one person (other than the user of communication device 110 is in the room when the picture is taken) and that person has been identified by speaker identifier 420 based on his/her voice, no additional image recognition may be performed since the only person has been identified. In this case, the picture may be tagged with the name of the person identified by speaker identifier 420. In cases where more than one person are in the room when the picture is taken and multiple people have been identified by speaker identifier 420 based on their voices, matching logic 450 may automatically identify which person in the picture is associated with which voice based on, for example, detecting who was talking when speaker identifier 420 identified the particular person.

For example, if person identifier 430 detected movement of Jane's mouth when speaker identifier 420 identified that the person talking was Jane, matching logic 450 may tag the picture with information indicating that Jane is in the picture and where in the picture Jane is located (e.g., identify coordinates in the picture where Jane is located relative to a reference point). Similar processing may occur to identify other parties in the picture. In these cases, once a person has been identified as being in a picture, image information associated with that person may be stored in image information field 530 in database 440. The information in image information field 530 may be used at a later time to identify that person.

Organizer logic 460 may organize the pictures taken via camera 270 based on the tag information (act 750). For example, organizer logic 460 may store pictures in categories based on who is in the picture. As an example, organizer logic 460 may identify pictures that include tag information that identifies Jane. Organizer logic 460 may then store all pictures that include Jane in a category accessible by entering or selecting the name Jane. Similarly, all pictures that include Bill may be stored in a category accessible by entering/selecting the name Bill. These pictures may not actually be stored together, but may be stored in a linked manner or may be retrieved together based on the tag information so that all the pictures with a particular tag may be accessed in a simplified manner. That is, the pictures of a particular person may be retrieved in a simple manner, as opposed to having to look through all the stored pictures to identify the particular pictures of interest.

Organizer program 410 may also automatically tag pictures previously taken and stored in communication device 110. For example, matching logic 450 and/or person identifier 430 may access pictures stored in, for example, memory 330. Matching logic 450 may compare images of people in the saved pictures to information stored in image information field 530. When a match is detected, matching logic 450 may store a tag with the picture indicating who is present in the picture.

Figure 8:
FIG. 8 is an exemplary user interface provided by the organizer program of FIG. 4.

FIG. 8 illustrates an exemplary interface 800 used to store and retrieve pictures. Referring to FIG. 8, interface 800 illustrates a number of names listed in alphabetical order. By clicking on one of the names/boxes in interface 800, all pictures in which that particular party is present may be retrieved from memory 330. For example, assume that the user clicks on the name Betty. Organizer logic 460 may then identify all pictures which include the tag "Betty" and retrieve these pictures. These pictures may then be displayed in any number of manners, such as sequentially, together in a reduced size format on one or more pages/screens, etc. In this manner, organizer program 410 provides for automatically storing pictures in an organized manner that allows for a simplified retrieval process. Videos and other multi-media information may be tagged, displayed and retrieved in a similar manner as the pictures described above.

In addition, as described above, organizer logic 460 may store a small label on each picture with the names of the parties in the picture. For example, organizer logic 460 may store a small label at the bottom of each picture with the names of the parties in the picture. Alternatively, organizer logic 460 may place a small label identifying the person next to the person's image in the picture. In still other implementations, the name information may be displayed in a window or cloud that is temporarily displayed and then removed. In still further implementations, the names may be displayed when a cursor or keypad control briefly stops over the person's image or a user clicks on the person. In such implementations, the name of the person may briefly appear in a window or cloud over the person.

The tag information stored with the pictures/videos may also allow for automatic or semi-automatic sending of the pictures to various parties. For example, organizer program 410 may signal or instruct a messaging (e.g., email program, chat program, etc.) to automatically transmit a message including an attached picture in which the user is present. For example, in the example above, organizer program 410 may signal a messaging program to send the picture that includes Jane and Bill to email addresses associated with Jane and Bill, respectively.

In other instances, organizer program 410 may signal the messaging program to send the picture to each party that was identified as being present when the picture was taken. For example, in the example above, Anna may have been identified via matching logic 450 as being present when the picture of Jane and Bill was taken. In this case, organizer program 410 may signal the messaging program to send the picture to Anna (as well as Jane and Bill).

In still other instances, prior to sending the picture, organizer program 410 may prompt the user with a message such as "Do you want to send the picture to everyone who was present?" or "Do you want to send the picture to everyone in the picture?" In this manner, organizer program 410 may automatically or semi-automatically send pictures to various parties who may be interested in receiving the picture.

Conclusion

Implementations consistent with aspects described herein provide for automatically identifying parties in pictures, videos or other multi-media presentations. This information may be used to tag pictures, videos, etc., with the identified parties. In addition, pictures/videos may be stored or organized based on the tagging. This may provide for enhanced user experience with respect to viewing pictures/videos. This enhanced functionality may also ease user frustration with respect to attempting to categorize/organize pictures. Simplifying the retrieval process for stored pictures may also increase the sharing of pictures via email, text messaging, etc. This may also increase revenue for a service provider associated with the receipt and transmission of messages.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, aspects described herein focus mainly on tagging pictures taken by a user of communication device 110. As described briefly above, in other instances, videos taken by the user of communication device 110 may be processed and tagged in a similar manner.

In addition, the matching of images and voice information to previously stored image/voice information has been described above as being performed by communication device 110. In other implementations, one of more of these functions may be performed by an external device. For example, server 130, as described above, may be associated with a service provider that provides communication services for communication device 110. In some implementations, server 130 may perform image and/or voice recognition associated with calls made to/from communication device 110. In some implementations, server 130 may also perform tagging associated with pictures taken by communication device 110. For example, a user of communication device 110 may send pictures to server 130 and server 130 may tag the pictures with identification information.

Still further, in some implementations, communication device 110 may include location information in the tag information. For example, assume that the user of communication device 110 has taken pictures in Washington, D.C. Further assume that communication device 110 includes, for example, a global positioning system (GPS) system that identifies its location. Communication device 110 may then tag all pictures taken in Washington D.C. with a tag or label identifying Washington, D.C. This information may then be displayed with the pictures, used to categorize/organize pictures, etc.

In addition, as discussed above, in some implementations, camera 270 of communication device 110 may take and store videos or video clips. In such instances, organizer program 410 may be used to track various people in the video. For example, speaker identifier 420, person identifier 430 and/or matching logic 450 may track people in the video based on voice information, mouth movements and image recognition. As an example, when a person is talking, person identifier 430 may identify the movement of the person's mouth indicating that the person is speaking. At the same time or essentially the same time, speaker identifier 420 may identify who is talking.

Matching logic 450 may then tag the video with information indicating who is/are present and the time that the particular people are present. This tag information may then be used to search the video for a particular person. For example, organizer program 410 may include an interface that allows a user to enter the name of a person. Organizer logic 460 may then retrieve all videos with that particular person and may also provide information indicating at what point in the video (e.g., at what time) that the person of interest is present. This may allow the user to easily retrieve particular videos or video clips of a particular person.

In some implementations, communication device 110 may include logic for allowing the user to automatically call or email a person by clicking on a tag in a picture or video. For example, if a picture includes the tag "Anna" (indicating that Anna is in the picture), a user may click on the tag "Anna" to place a telephone call to Anna. That is, communication device 110 may access a contacts program stored in communication device 110, retrieve Anna's telephone number and automatically place a call to Anna. In other instances, communication device 110 may access the contacts program, retrieve Anna's email address and automatically generate an email addressed to Anna, for which the user of communication device 110 will provide the appropriate text before sending. Alternatively, communication device 110 may retrieve the telephone number and/or email address for Anna and display the telephone number and/or email address to the user. The user may then click on the telephone number or email address to place a call or send an email to Anna.

Still further, the implementations described above refer to identifying people in pictures and/or videos and tagging the pictures/videos. In a similar manner, pets or other animals may be identified. For example, a dog may be detected as being present based on a bark. Tag information may then be stored with the picture indicating that the dog is present. This may allow a pet owner to quickly retrieve pictures/videos of his/her pet.

Further, while series of acts have been described with respect to FIGS. 6 and 7, the order of the acts may be varied in other implementations consistent with the invention. Moreover, non-dependent acts may be performed in parallel.

It will also be apparent to one of ordinary skill in the art that aspects of the invention, as described above, may be implemented in, for example, computer devices, cellular communication devices/systems, methods, and/or computer program products. Accordingly, aspects described herein may be embodied in hardware and/or in software (including firmware, resident software, micro-code, etc.). Furthermore, aspects of the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. In a device, a method comprising:
   storing a picture or video, the picture or video including at least a first person;
   automatically identifying the first person using at least one of speaker recognition or image recognition;
   tagging the picture or video with information indicating that the first person is in the picture or video;
   identifying an electronic mail address associated with the first person; and
   automatically sending the picture or video to the electronic mail address associated with the first person.

2. The method of claim 1, further comprising:
   storing the picture or video with a group of pictures or videos associated with the first person.

3. The method of claim 1, further comprising:
   providing all interface associated with retrieving pictures stored in the device;
   receiving a selection via the interface, the selection identifying a second person;
   retrieving a plurality of pictures associated with the second person based on the selection; and
   displaying the plurality of pictures.

4. The method of claim 1, further comprising:
   storing voice related information associated with the first person, and wherein the identifying the first person comprises:
   identifying the first person by comparing received voice input from the first person to the stored voice related information associated with the first person.

5. The method of claim 1, further comprising:
   storing image information associated with a plurality of people, and wherein the identifying the first person comprises:
   comparing the picture or video to the stored image information associated with the plurality of people, and
   identifying the first person based on the comparing.

6. The method of claim 1, further comprising:
   storing unique words voiced by the first person, and wherein the identifying the first person comprises:
   identifying the first person based on receipt of one of the unique words.

7. In a device, a method comprising:
   storing voice information associated with a plurality of people;
   storing image information associated with at least some of the plurality of people;
   storing a plurality of pictures;
   automatically identifying people in at least some of the plurality of pictures using the stored image information;
   automatically identifying people present when at least some of the plurality of pictures were taken using the stored voice information; and
   tagging the at least some of the plurality of pictures with identification information corresponding to the identified people.

8. A computer-readable medium having stored thereon sequences of instructions which, when executed by at least one processor, cause the at least one processor to:
   access a picture including at least a first person;
   identify the first person using image recognition;
   display the picture with information identifying the first person; and
   automatically signal a messaging program to transmit the picture to an electronic mail address associated with the first person.

9. The computer-readable medium of claim 8, further comprising instructions for causing the at least one processor to:
   tag the picture with information indicating that the first person is in the picture.

10. The computer-readable medium of claim 9, further comprising instructions for causing the at least one processor to:
    sort the picture based on the tag.

11. The computer-readable medium of claim 8, further comprising instructions for causing the at least one processor to:
    display the information identifying the first person for a period of time; and
    remove the information in the picture identifying the first person after the period of time.

12. The computer-readable medium of claim 8, further comprising instructions for causing the at least one processor to:
    provide an interface for accessing stored pictures, the interface including a plurality of names; and
    retrieve, in response to selection of a first one of the plurality names, pictures associated with the first name.

13. The computer-readable medium of claim 8, further comprising instructions for causing the at least one processor to:
    identify at least one other person in the picture using voice recognition.

14. A computer-readable medium having stored thereon sequences of instructions which, when executed by at least one processor, cause the at least one processor to:
    access a picture including at least a first person;
    identify the first person using image recognition;
    display the picture with information identifying the first person;
    identify a plurality of people present when the picture was taken; and
    signal a messaging program to transmit the picture to electronic addresses associated with the plurality of people.

15. A device, comprising:
    a memory configured to store a plurality of pictures;
    a camera configured to:
      take a picture including at least a first person, and
      store the picture in the memory;
    processing logic configured to:
      identify the first person using at least one of speaker recognition or image recognition; and
    a display,
    wherein the processing logic is further configured to:
    receive a selection identifying the first person,
    retrieve the picture from the memory, and display the picture via the display, the display including information identifying the first person.

16. The device of claim 15, wherein the processing logic is further configured to:

store a tag with the picture or a link to the tag in the memory, the tag identifying the first person.

17. The device of claim 15, wherein the processing logic is further configured to:

provide an input interface to a user of the device, the input interface being configured to allow a user to select a name or label associated with the first person, and retrieve, in response to selection of the name or label, a plurality of pictures associated with the first person.

18. The device of claim 15, wherein the processing logic comprises:

speaker recognition logic configured to:
receive voice input from the first person, and
identify the first person using speaker recognition.

19. The device of claim 15, wherein the processing logic comprises:

person identifier logic configured to store image related information associated with a plurality of people in a database, and
identify the first person based on the stored image related information.

20. The device of claim 19, wherein the processing logic is further configured to:

identify parties in the plurality of pictures using information stored in the database.

\* \* \* \* \*

UNITED STATES PATENT AND TRADEMARK OFFICE
CERTIFICATE OF CORRECTION

PATENT NO. : 8,144,939 B2
APPLICATION NO. : 11/936991
DATED : March 27, 2012
INVENTOR(S) : Ola Karl Thörn It is certified that error appears in the above-identified patent and that said Letters Patent is hereby corrected as shown below:

In claim 3, line 2 (at column 17, line 34), change the word "all" to "an".

Signed and Sealed this
Thirty-first Day of July, 2012

David J. Kappos
*Director of the United States Patent and Trademark Office*